US012222719B2

(12) United States Patent
Endo et al.

(10) Patent No.: US 12,222,719 B2
(45) Date of Patent: Feb. 11, 2025

(54) INFORMATION PROCESSING DEVICE AND INFORMATION PROCESSING METHOD

(71) Applicant: SONY GROUP CORPORATION, Tokyo (JP)

(72) Inventors: Yuki Endo, Tokyo (JP); Keisuke Maeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 109 days.

(21) Appl. No.: 17/905,242

(22) PCT Filed: Feb. 12, 2021

(86) PCT No.: PCT/JP2021/005297
§ 371 (c)(1),
(2) Date: Aug. 29, 2022

(87) PCT Pub. No.: WO2021/176997
PCT Pub. Date: Sep. 10, 2021

(65) Prior Publication Data
US 2023/0135955 A1 May 4, 2023

(30) Foreign Application Priority Data
Mar. 6, 2020 (JP) ................................. 2020-039058

(51) Int. Cl.
G05D 1/00 (2024.01)
G06V 10/762 (2022.01)
G06V 20/58 (2022.01)

(52) U.S. Cl.
CPC ......... *G05D 1/0212* (2013.01); *G05D 1/0088* (2013.01); *G06V 10/762* (2022.01); *G06V 20/58* (2022.01)

(58) Field of Classification Search
CPC .... G05D 1/0212; G05D 1/0088; G05D 1/028; G05D 1/0214; G05D 1/0246;
(Continued)

(56) References Cited

U.S. PATENT DOCUMENTS 7,818,090 B2 * 10/2010 Okamoto ............. G05D 1/0272
700/255
9,776,323 B2 * 10/2017 O'Sullivan ............ G06N 20/00
(Continued)

FOREIGN PATENT DOCUMENTS

CN 107703948 A 2/2018
CN 109032145 A 12/2018
(Continued)

OTHER PUBLICATIONS

International Search Report and Written Opinion of PCT Application No. PCT/JP2021/005297, issued on Apr. 13, 2021, 08 pages of ISRWO.

*Primary Examiner* — Tyler D Paige
(74) *Attorney, Agent, or Firm* — CHIP LAW GROUP

(57) ABSTRACT

An information processing apparatus includes a crowd characteristic estimator and a plan controller. The crowd characteristic estimator estimates information regarding a characteristic of a crowd on the basis of a sensing result of an external environment. The crowd is a collection of individuals present in the external environment. The plan controller controls a creation mode of an action plan for a movable body in the external environment on the basis of at least the information regarding the characteristic.

17 Claims, 10 Drawing Sheets

(58) Field of Classification Search
CPC ...... G06V 10/762; G06V 20/58; G06V 20/53; B25J 13/08
USPC .......................................................... 701/25
See application file for complete search history.

(56) References Cited

U.S. PATENT DOCUMENTS

| | | | |
|---|---|---|---|
| 11,213,943 B2* | 1/2022 | Kim | G06Q 10/0631 |
| 2007/0179792 A1* | 8/2007 | Kramer | G06Q 30/02 |
| | | | 705/1.1 |
| 2017/0190051 A1* | 7/2017 | O'Sullivan | G05D 1/0088 |
| 2018/0107217 A1* | 4/2018 | Asada | G05D 1/0088 |
| 2019/0176333 A1* | 6/2019 | Hager, IV | B25J 9/1676 |
| 2019/0230320 A1* | 7/2019 | Moriya | H04N 7/18 |
| 2019/0329418 A1* | 10/2019 | Sutherland | B25J 9/1694 |
| 2019/0355173 A1* | 11/2019 | Gao | G06T 19/20 |
| 2020/0050206 A1* | 2/2020 | Deyle | G01S 13/876 |
| 2020/0053324 A1* | 2/2020 | Deyle | G01C 21/20 |
| 2020/0053325 A1* | 2/2020 | Deyle | H04N 7/185 |
| 2023/0135955 A1* | 5/2023 | Endo | G06V 20/58 |
| | | | 701/25 |

FOREIGN PATENT DOCUMENTS

| | | |
|---|---|---|
| JP | 2008-142876 A | 6/2008 |
| JP | 2011054082 A | 3/2011 |
| JP | 2019-036192 A | 3/2019 |
| JP | 2019219734 A | 12/2019 |
| JP | 2020021351 A | 2/2020 |
| JP | 2020046384 A | 3/2020 |
| JP | 2020046759 A | 3/2020 |
| WO | WO-2013011543 A1 | 1/2013 |
| WO | 2017/159060 A1 | 9/2017 |
| WO | 2019/078010 A1 | 4/2019 |

* cited by examiner

[FIG. 1]
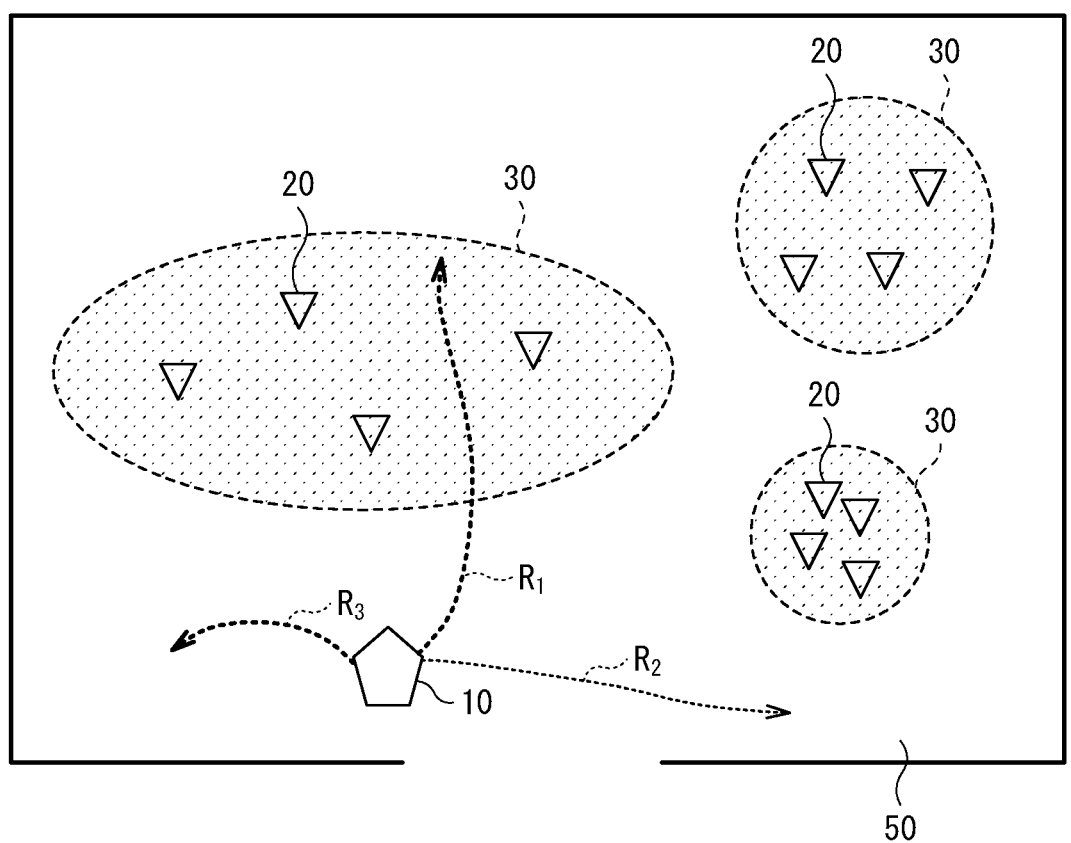

[FIG. 2]
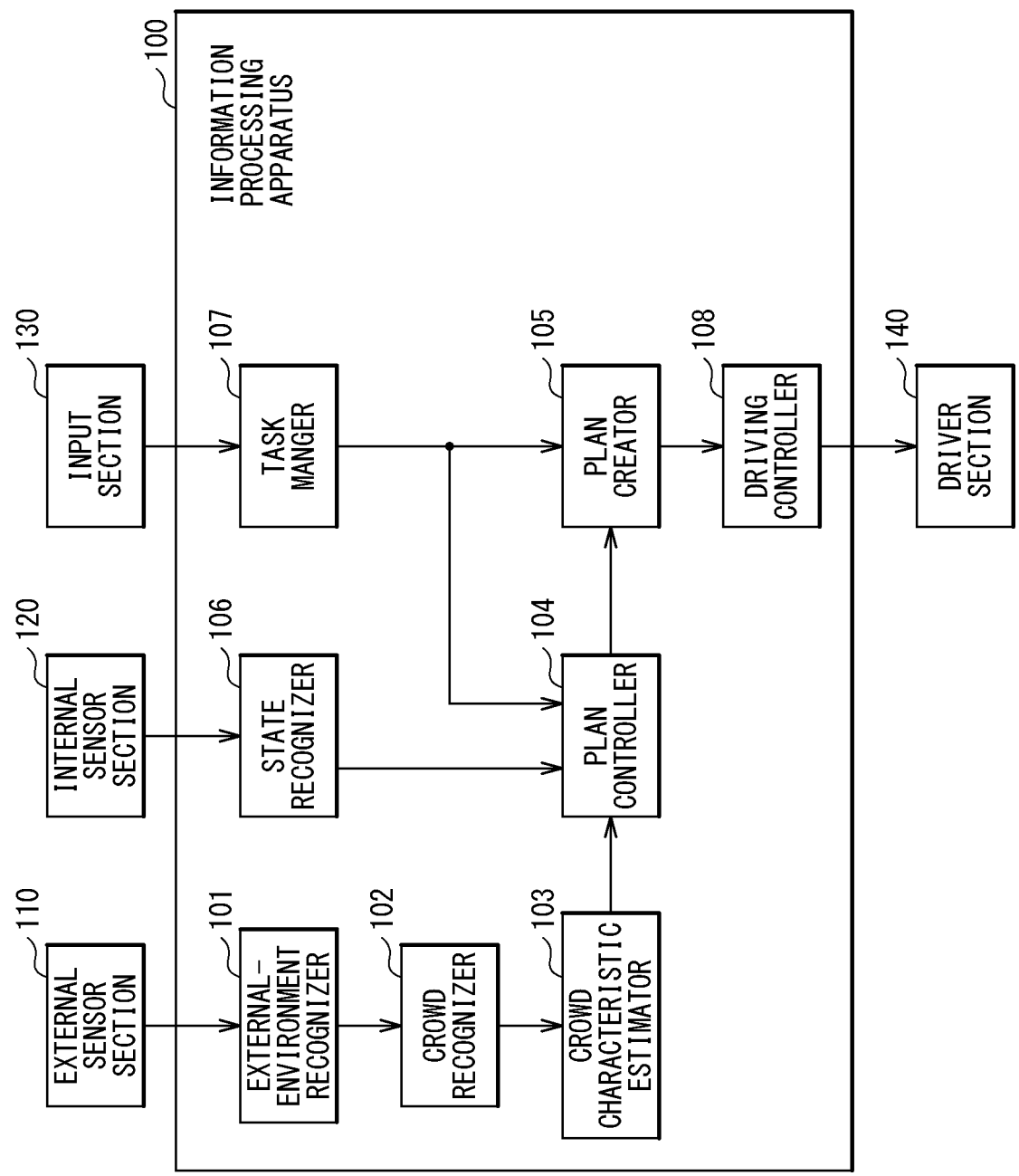

[FIG. 3A]
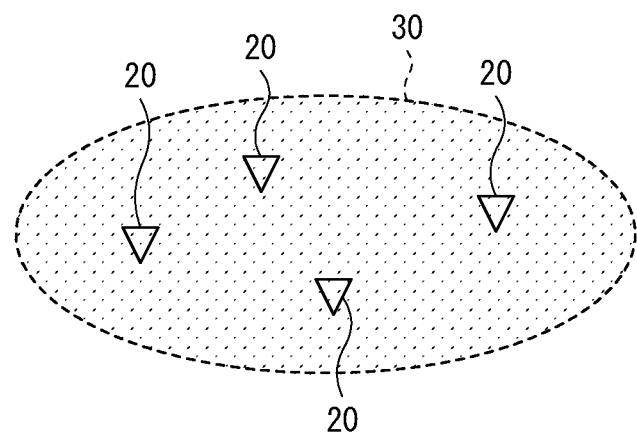
[FIG. 3B]
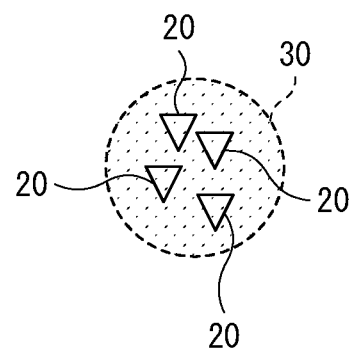

[FIG. 4]
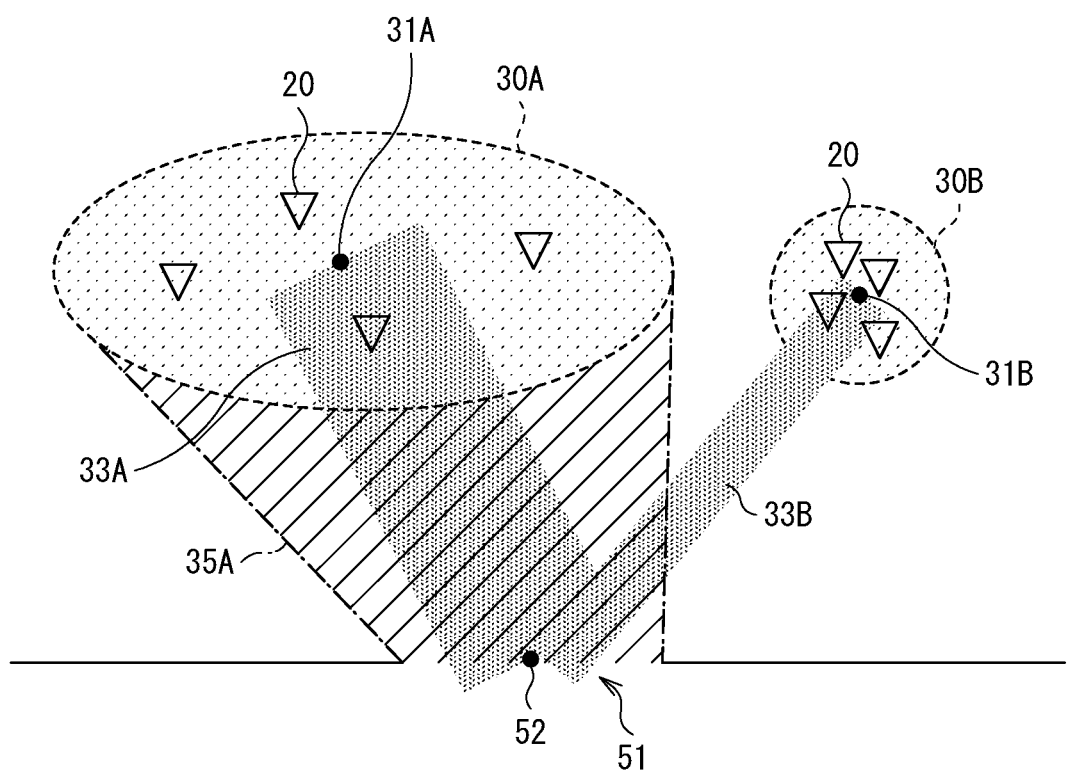

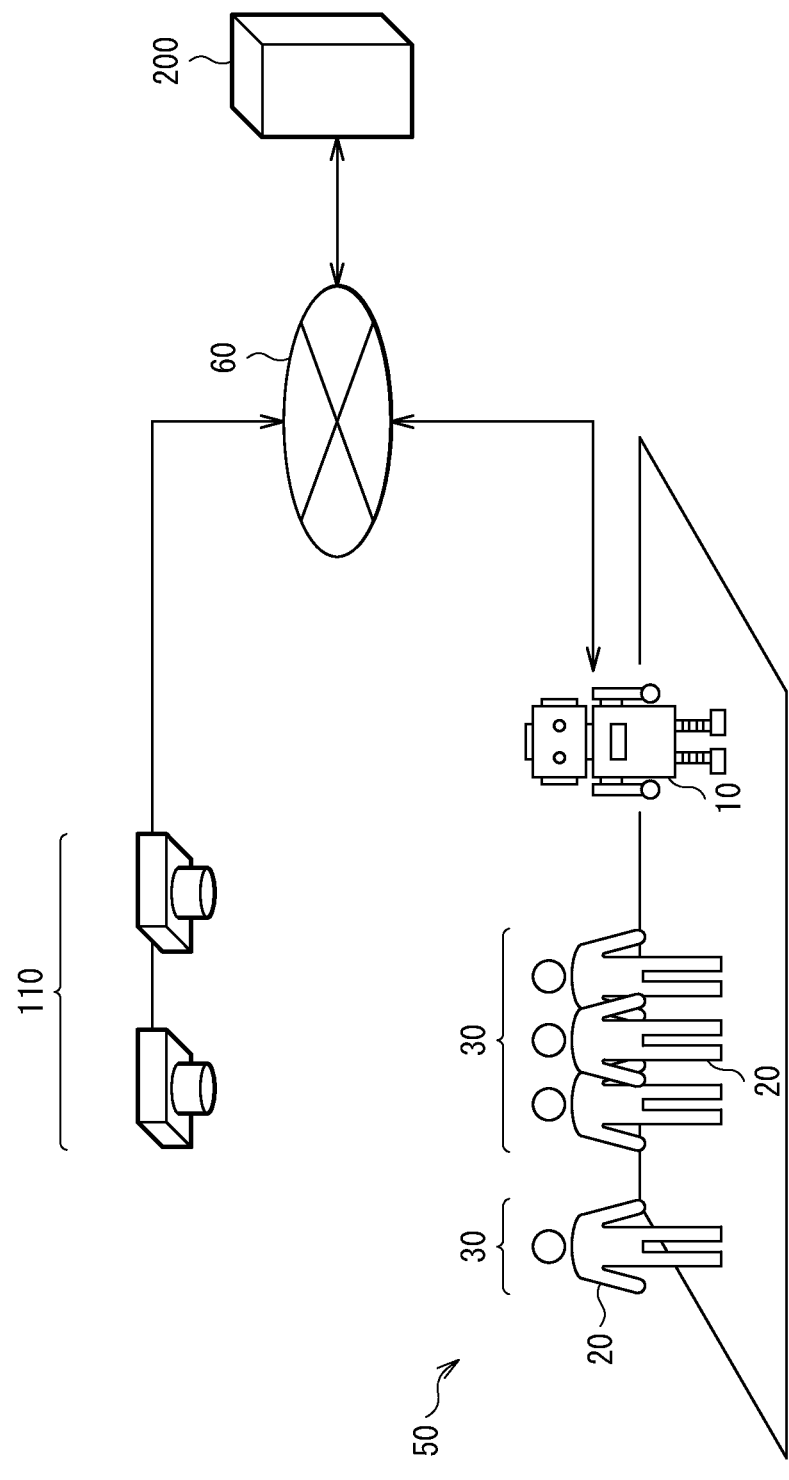
[FIG. 5]

[FIG. 6]
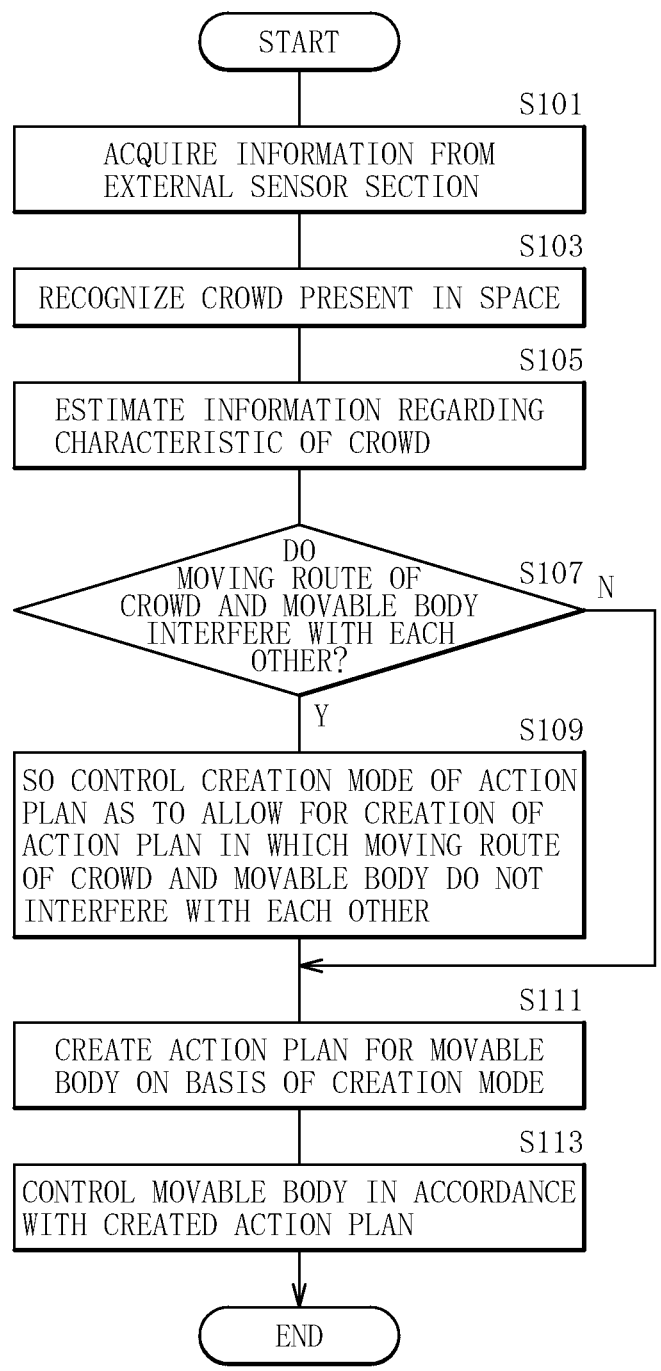

[FIG. 7A]
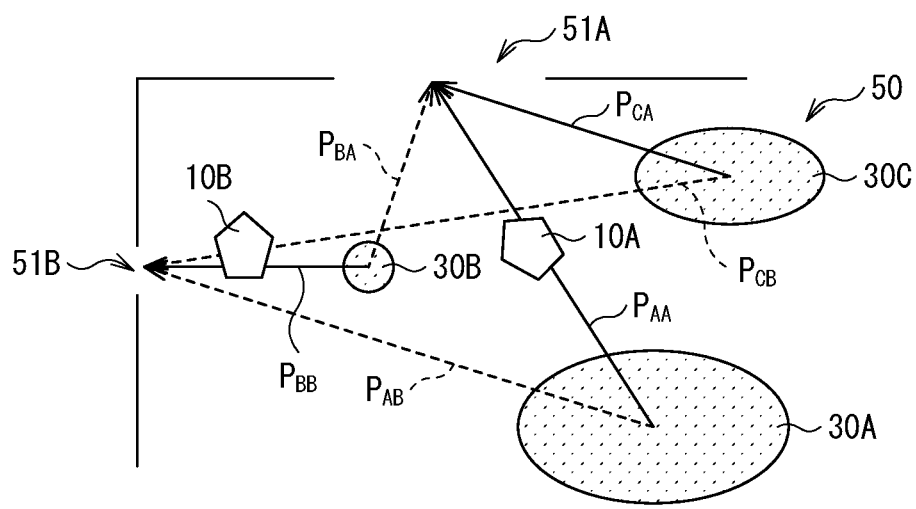
[FIG. 7B]
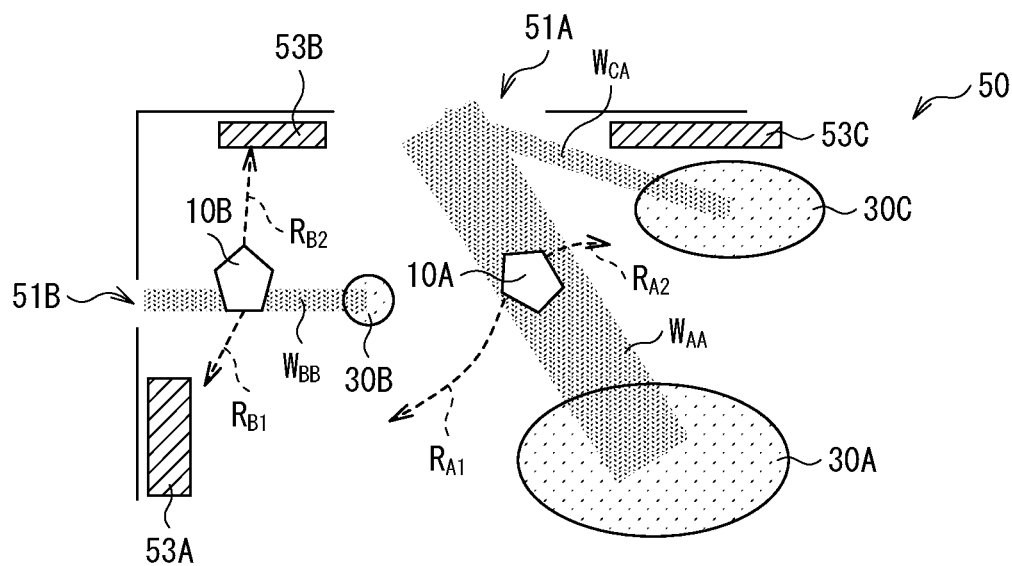

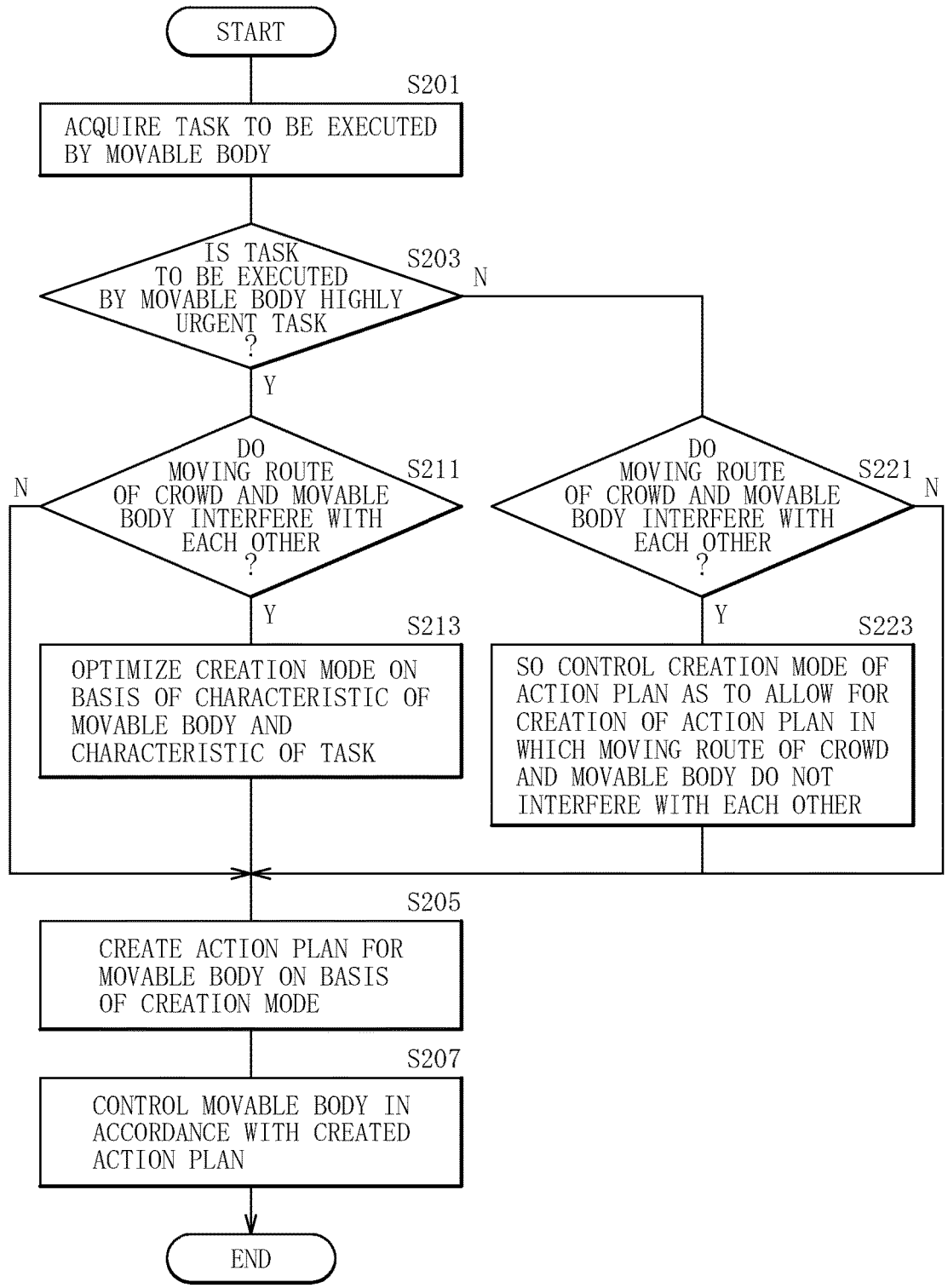

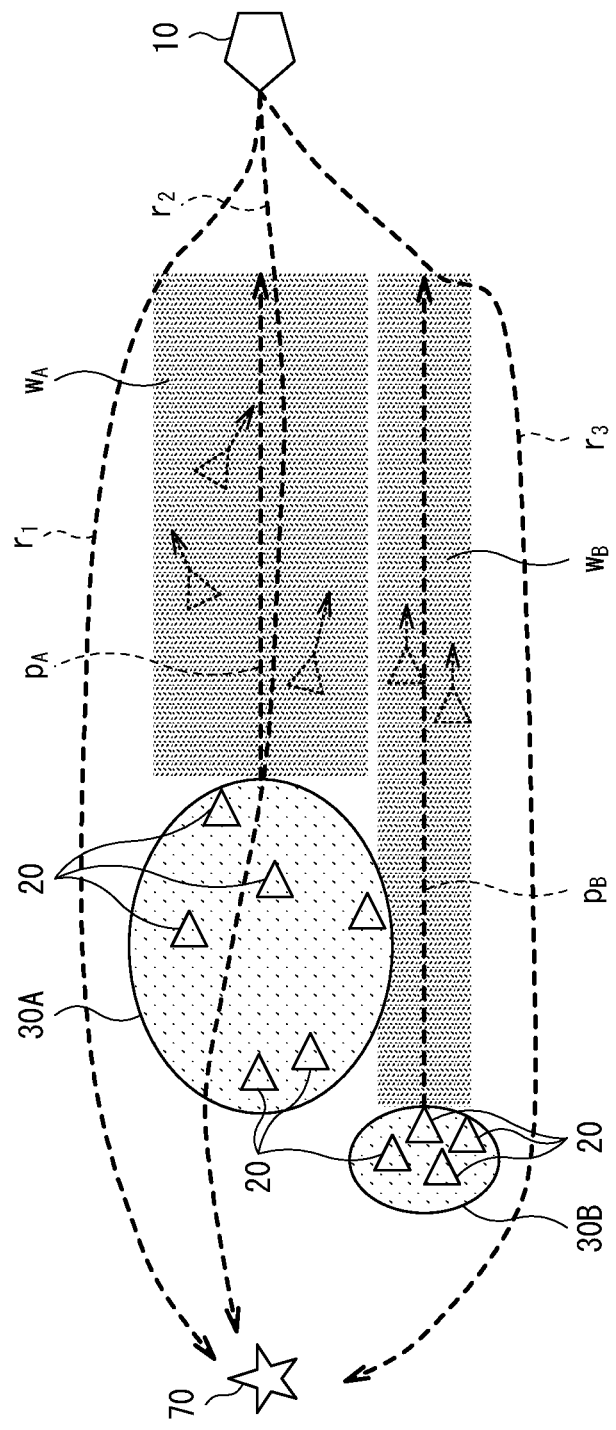
[FIG. 9]

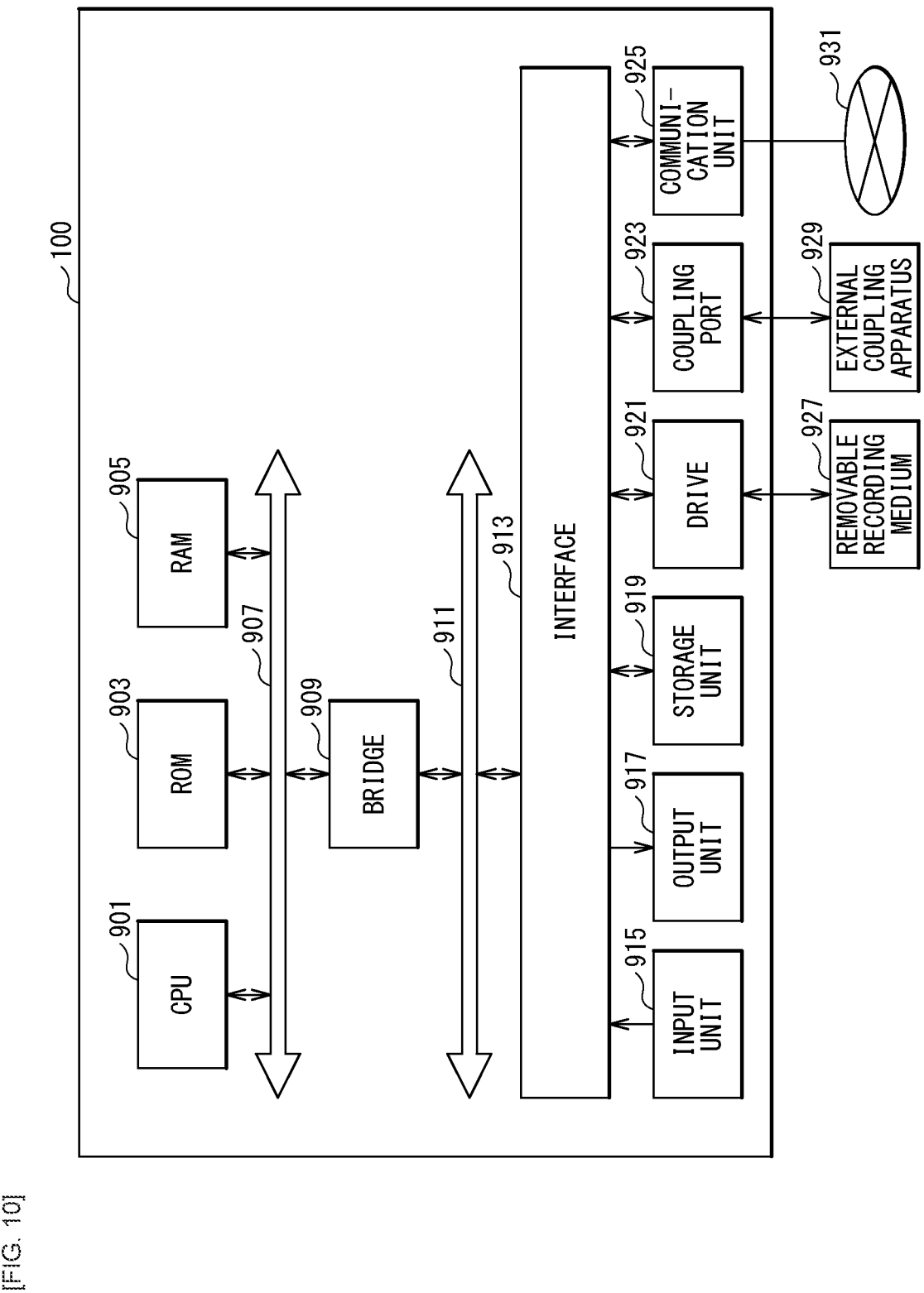
[FIG. 10]

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/005297 filed on Feb. 12, 2021, which claims priority benefit of Japanese Patent Application No. JP 2020-039058 filed in the Japan Patent Office on Mar. 6, 2020. Each of the above-referenced applications is hereby incorporated herein by reference in its entirety.

TECHNICAL FIELD

The present disclosure relates to an information processing apparatus, an information processing method, and a program.

BACKGROUND ART

Recently, it has been attempted to provide a service such as information provision or guidance using an autonomously movable robot in a store, an entertainment facility, a public facility, or the like (for example, PTL 1).

CITATION LIST

Patent Literature

PTL 1: Japanese Unexamined Patent Application Publication No. 2008-142876

SUMMARY OF THE INVENTION

In such a venue where a number of unspecified users are present, it is desired that a robot provide a service such as information provision or guidance to the users without any confusion even in a case where many users have come to the venue.

Therefore, it is desirable to provide an information processing apparatus, an information processing method, and a program that make it possible to create an action plan that causes a movable body to operate more efficiently even in an environment with presence of many users.

An information processing apparatus according to one embodiment of the present disclosure includes a crowd characteristic estimator and a plan controller. The crowd characteristic estimator estimates information regarding a characteristic of a crowd on the basis of a sensing result of an external environment. The crowd is a collection of individuals present in the external environment. The plan controller controls a creation mode of an action plan for a movable body in the external environment on the basis of at least the information regarding the characteristic.

An information processing method according to one embodiment of the present disclosure includes: by a calculation processor, estimating information regarding a characteristic of a crowd on the basis of a sensing result of an external environment, the crowd being a collection of individuals present in the external environment; and controlling a creation mode of an action plan for a movable body in the external environment on the basis of at least the information regarding the characteristic.

A program according to one embodiment of the present disclosure causing a computer to function as a crowd characteristic estimator and a plan controller. The crowd characteristic estimator estimates information regarding a characteristic of a crowd on the basis of a sensing result of an external environment. The crowd is a collection of individuals present in the external environment. The plan controller controls a creation mode of an action plan for a movable body in the external environment on the basis of at least the information regarding the characteristic.

According to the information processing apparatus, the information processing method, and the program according to one embodiment of the present disclosure, it is possible to estimate information regarding a characteristic of a crowd, which is a collection of individuals present in an external environment, on the basis of a sensing result of the external environment, and to control a creation mode of an action plan for the movable body in the external environment on the basis of the information regarding the estimated characteristic. This allows the information processing apparatus to take into consideration, in the action plan for the movable body, for example, not the move of each of the individuals but a move or a characteristic of the crowd which is a collection of the individuals.

BRIEF DESCRIPTION OF DRAWINGS

FIG. 1 is a schematic explanatory diagram describing about a movable body to be a target of a technology according to the present disclosure.

FIG. 2 is a block diagram illustrating a functional configuration of an information processing apparatus according to one embodiment of the present disclosure.

FIG. 3A is a schematic explanatory diagram describing about a characteristic of a crowd.

FIG. 3B is a schematic explanatory diagram describing about the characteristic of the crowd.

FIG. 4 is a schematic explanatory diagram describing about the characteristic of the crowd.

FIG. 5 is a schematic explanatory diagram describing about a configuration example in a case where the information processing apparatus according to the embodiment, the movable body, and an external sensor section are provided individually.

FIG. 6 is a flowchart illustrating a flow of a first operation example of the information processing apparatus according to the embodiment.

FIG. 7A is an explanatory diagram describing about estimation of a moving route of the crowd in the first operation example.

FIG. 7B is an explanatory diagram describing about creation of an action plan for the movable body in the first operation example.

FIG. 8 is a flowchart illustrating a flow of a second operation example of the information processing apparatus according to the embodiment.

FIG. 9 is an explanatory diagram describing about creation of the action plan for the movable body in the second operation example.

FIG. 10 is a block diagram illustrating a hardware configuration example of the information processing apparatus according to the embodiment.

MODES FOR CARRYING OUT THE INVENTION

In the following, embodiments of the present disclosure will be described in detail with reference to the drawings. The embodiments described below are specific examples of the present disclosure, and the technology according to the present disclosure is not limited to the following embodiments. In addition, arrangements, dimensions, dimensional ratios, and the like of the respective constituent elements of the present disclosure are not limited to the embodiments illustrated in each of the drawings.

Note that the description will be given in the following order.

1. Outline
2. Configuration Examples
3. Relationship between Information Processing Apparatus and Movable Body
4. Operation Examples
    4.1. First Operation Example
    4.2. Second Operation Example
5. Hardware Configuration Examples

1. Outline

First, an outline of the technology according to the present disclosure is to be described with reference to FIG. 1. FIG. 1 is a schematic explanatory diagram describing about a movable body 10 to be a target of the technology according to the present disclosure.

As illustrated in FIG. 1, the movable body 10 to be the target of the technology according to the present disclosure is, for example, a movable body that is able to autonomously determine a route and move in a space 50 where many individuals 20 are present.

Specifically, the space 50 is a space in which a number of unspecified users are to come, such as a showroom, an exhibition, a bank, a store, an art museum, an entertainment facility, or a public facility, and the individual 20 is, for example, a customer who has come to the space 50. The movable body 10 is, for example, a robot apparatus that autonomously moves and performs guidance or the like for the individual 20 who has come to the space 50.

In such a use case, it is desired that the movable body 10 move avoiding movement lines of the individuals 20 each moving individually, and thereby avoid blocking the movements of the individuals 20.

In order to achieve the above, for example, it is conceivable to cause the movable body 10 to operate in accordance with a policy that "in a case of becoming close to the individual 20, perform an action of avoiding the individual 20". However, in such a case, as the number of the individuals 20 increases, the movable body 10 may have an ad hoc or staggering move because of performing the avoiding action for each individual 20. Such an unstable move may make the individual 20 feel uneasy, and this is not desirable.

Further, in order to achieve the above, for example, it is conceivable not to cause the movable body 10 to move in a normal situation where the respective moves of the individuals 20 are non-uniform, and to cause the movable body 10 to move for guidance or the like of the individuals 20 only in an evacuation situation such as a hazard situation where the respective movements of the individuals 20 are made uniform easily. According to this, it seems that to cause the movable body 10 to move only in a situation where the movement line of the individual 20 is simple makes it possible to reduce the possibility that the movable body 10 blocks the movement line of the individual 20. However, in such a case, the movable body 10 has to include various sensors that measure a surrounding environment and a processor circuit that determines the situation on the basis of the sensing results from the various sensors in order to determine whether it is the normal situation or the emergency situation. This results in an increase in operation cost of the movable body 10. Further, in a case where the robustness (i.e., erroneous detection resistance) of the various sensors is low, erroneous detection by the various sensors may make the move of the movable body 10 more unstable.

The technology according to the present disclosure has been conceived in view of the above circumstances. The technology according to the present disclosure is able to optimize a creation mode of an action plan for the movable body 10 by recognizing a collection of the individuals 20 as a crowd 30 and estimating a characteristic of the recognized crowd 30. According to the technology according to the present disclosure, even in the space 50 where many individuals 20 are present, it is possible to cause the movable body 10 to move smoothly so as not to adversely affect the individuals 20.

Specifically, in the technology of the present disclosure, first, the characteristic of the crowd 30 is estimated with use of a sensing result regarding the crowd 30 which is a collection of the individuals 20. The characteristic of the crowd 30 is, for example, a moving characteristic such as a moving direction or a moving speed of the crowd 30, a density of the individuals 20 in the crowd 30, a mutual social connection degree of the individuals 20, or randomness of the moves of the individuals 20, or the like. Further, in the technology of the present disclosure, the creation mode of the action plan for the movable body 10 is controlled on the basis of the estimated characteristic of the crowd 30. This makes it possible to cause the movable body 10 to so move as to avoid blocking the movement lines of the individuals 20.

According to this, for example, in a case where the density of the individuals 20 in the crowd 30 is high, the movable body 10 is able to create an action plan including a route $R_2$ or a route $R_3$ that does not pass through the inside of the crowd 30 and avoids the movement line of the crowd 30. Further, in a case where the density of the individuals 20 in the crowd 30 is low, the movable body 10 is able to create an action plan including a route $R_1$ that passes between the individuals 20 inside the crowd 30.

Note that it is described above that the individual 20 is a user who has come to the space 50 such as a showroom, an exhibition, a bank, a store, an art museum, an entertainment facility, or a public facility; however, the technology according to the present disclosure is not limited to the above example. The individual 20 is not limited to a human as long as it is a target that moves individually, and may be a domestic animal such as a cow, a horse, or sheep grazed in the space 50 such as a farm.

2. Configuration Examples

In the following, referring to FIGS. 2, 3A, 3B, and 4, a description is given of a configuration of an information processing apparatus 100 of one embodiment of the technology according to the present disclosure the outline of which has been described above. FIG. 2 is a block diagram illustrating a functional configuration of the information processing apparatus 100 according to the present embodiment. FIGS. 3A, 3B, and 4 are each a schematic explanatory diagram describing about the characteristic of the crowd 30.

As illustrated in FIG. 2, the information processing apparatus 100 according to the present embodiment includes, for example, an external-environment recognizer 101, a crowd recognizer 102, a crowd characteristic estimator 103, a plan controller 104, a plan creator 105, a state recognizer 106, a task manger 107, and a driving controller 108.

The external-environment recognizer 101 recognizes an external environment around the movable body 10 on the basis of a sensing result of the external environment acquired from an external sensor section 110. Specifically, the external-environment recognizer 101 recognizes a position, a move, and the like of the individual 20 present around the movable body 10 on the basis of the sensing result obtained by the external sensor section 110. Further, the external-environment recognizer 101 may recognize positions, kinds, moves, and the like of various objects other than individual 20 that are present around the movable body 10, on the basis of the sensing result obtained by the external sensor section 110. Thus, the external-environment recognizer 101 is able to recognize the external environment in which the movable body 10 is present. Note that the external-environment recognizer 101 may perform recognition of the external environment on the basis of a predetermined rule, or may perform the recognition of the external environment on the basis of a machine-learning algorithm.

Further, the external-environment recognizer 101 may create an environment map representing an environment around the movable body 10 on the basis of a result of the recognition of the external environment. Specifically, the external-environment recognizer 101 may create an environment map representing the positions and the moves of the individual 20 and various objects other than the individual 20 that are present around the movable body 10. For example, the external-environment recognizer 101 may create an environment map of an environment around the movable body 10 on the basis of a result of image recognition performed on an image capturing the environment around the movable body 10. The environment map created by the external-environment recognizer 101 may be, for example, an occupancy grid map (Occupancy Grid Map), a lane map (Lane Map), a point cloud map (Point Cloud Map), or the like.

The external sensor section 110 may include, for example, an imaging device that detects information regarding the environment around the movable body 10, such as a stereo camera, a monocular camera, a color camera, an infrared-ray camera, or a polarization camera. Further, the external sensor section 110 may include an environment sensor that detects weather, a weather condition, or the like, a microphone that detects a sound, or a ranging sensor that measures a distance to a nearby object such as an ultrasonic sensor (Sound Navigation And Ranging: SONAR), a ToF (Time of Flight) sensor, or a LiDAR (Light Detection And Ranging) sensor. The various sensors included in the external sensor section 110 may be provided, for example, in the movable body 10, or may be provided on a wall, a ceiling, or the like in the space 50 separately from the movable body 10.

The crowd recognizer 102 recognizes the crowd 30, which is a collection of the individuals 20, on the basis of the sensing result of the external environment acquired from the external sensor section 110. Specifically, the crowd recognizer 102 may recognize, as the crowd 30, each cluster obtained by clustering the individuals 20 with use of an overlapping degree of respective bodies of the individuals 20 recognized by the external-environment recognizer 101 and a direction of the overlapping degree as parameters. Thus, the crowd recognizer 102 is able to recognize the plurality of individuals 20 present in the external environment as a crowd 30 performing similar moves.

Note that the crowd recognizer 102 may recognize the crowd 30, which is a collection of the individuals 20, by using a method other than the above-described clustering. For example, in a case where distances between the two or more individuals 20 are within a threshold, the crowd recognizer 102 may recognize the two or more individuals 20 as one crowd 30.

The crowd characteristic estimator 103 estimates information regarding a characteristic of each crowd 30 recognized by the crowd recognizer 102.

For example, the crowd characteristic estimator 103 may estimate information regarding the number of the individuals 20 in the crowd 30, the occupied area of the crowd 30, or the density of the individuals 20 in the crowd 30 from the sensing result of the external sensor section 110. Specifically, the crowd characteristic estimator 103 may estimate the information regarding the number of the individuals 20 in the crowd 30, the occupied area of the crowd 30, or the density of the individuals 20 in the crowd 30 from an image captured by the imaging device included in the external sensor section 110.

Note that the occupied area of the crowd 30 may be estimated as, for example, the area of a region within a closed curve connecting the individuals 20 present on the outermost periphery of the crowd 30 with one another, or may be estimated as the area in a region in which a region having a predetermined width is further added to the outside of the above-described closed curve. Note that the occupied area of the crowd 30 may be estimated as the area of a region within a closed curve including a polygonal line having the respective vertices corresponding to the individuals 20, or may be estimated as the area of a region within a closed curve including a curve obtained by smoothing such vertices.

In addition, the crowd characteristic estimator 103 may further estimate other information regarding the characteristic of the crowd 30 (i.e., corresponding to secondary information) from the density of the individuals 20 in the crowd 30 (i.e., corresponding to primary information). Specifically, the crowd characteristic estimator 103 may estimate information regarding the mutual social connection degree of the individuals 20 included in the crowd 30 or the randomness of the moves of the individuals 20 included in the crowd 30 from the density of the individuals 20 included in the crowd 30.

Other characteristics to be estimated from the density of the individuals 20 in the crowd 30 are to be described with reference to FIGS. 3A and 3B. As illustrated in FIG. 3A, in a case where the density of the individuals 20 in the crowd 30 is low, the distances between the individuals 20 in the crowd 30 are greater. In contrast, as illustrated in FIG. 3B, in a case where the density of the individuals 20 in the crowd 30 is high, the distances between the individuals 20 in the crowd 30 are shorter.

Here, it is conceivable that people who have a deeper social relationship and are more intimate have a higher degree of personal space sharing, which results in a shorter distance therebetween. Accordingly, the crowd characteristic estimator 103 is able to estimate that the higher the density of the individuals 20 in the crowd 30 is, the higher the mutual social connection degree of the individuals 20 included in the crowd 30 is (that is, the deeper the social relationship is). Note that the crowd characteristic estimator 103 is also able to estimate the mutual social connection degree of the individuals 20 in the crowd 30, further taking into consideration the consistency of the moving direction of the individuals 20 in the time axis, a body language such as the facial expression of the individuals 20, and the like.

In addition, it is conceivable that the closer the individuals 20 are to each other, the higher the possibility that individuals 20 act in a coordinated or synchronized way with each other. Accordingly, the crowd characteristic estimator 103 is able to estimate that the higher the density of the individuals 20 in the crowd 30 is, the lower the possibility that each of the individuals 20 makes a sudden move is. Accordingly, the crowd characteristic estimator 103 is able to estimate that the higher the density of the individuals 20 in the crowd 30 is, the lower the randomness of the respective moves of the individuals 20 included in the crowd 30 is.

Further, for example, the crowd characteristic estimator 103 may estimate information regarding a moving characteristic of the crowd 30 from the sensing result of the external sensor section 110. Specifically, the crowd characteristic estimator 103 may estimate information regarding the moving direction and the moving speed of the crowd 30 on the basis of a captured image acquired by the external sensor section 110. Note that the crowd characteristic estimator 103 may regard the average of the moving directions and the average of the moving speeds of the respective individuals 20 included in the crowd 30 as the moving direction and the moving speed of the crowd 30, or may regard the moving direction and the moving speed of a representative individual 20 of the individuals 20 included in the crowd 30 as the moving direction and the moving speed of the crowd 30.

In addition, the crowd characteristic estimator 103 may further estimate another information regarding the characteristic of the crowd 30 (i.e., corresponding to secondary information) from the moving direction and the moving speed of the crowd 30 (i.e., corresponding to primary information). For example, the crowd characteristic estimator 103 may estimate information regarding a moving route of the crowd 30 or a region which the crowd 30 passes through upon moving, from the moving direction and the moving speed of the crowd 30.

Other characteristics to be estimated from the moving direction and the moving speed of the crowd 30 is to be described with reference to FIG. 4. As illustrated in FIG. 4, the crowd characteristic estimator 103 is able to estimate the moving routes of crowds 30A and 30B by referring to the positions of the crowds 30A and 30B and the position of an object to be a destination such as a doorway 51 in addition to the moving directions and the moving speeds of the crowds 30A and 30B. Note that the crowd characteristic estimator 103 may estimate the moving routes of the crowds 30A and 30B only from the moving directions and the moving speeds of the crowds 30A and 30B, or may estimate the moving routes of the crowds 30A and 30B from the positions of the crowds 30A and 30B and the position of the object such as the doorway 51.

Here, the crowd characteristic estimator 103 is able to estimate the regions which the crowds 30A and 30B pass through upon moving, from the estimated moving routes of the crowds 30A and 30B. For example, the crowd characteristic estimator 103 may estimate a region 35A obtained by projecting the outline of the occupied area of the crowd 30A to the object such as the doorway 51 to be the destination, as the region which the crowd 30A passes through upon moving.

Alternatively, the crowd characteristic estimator 103 may regard, as the region which the crowd 30A passes through upon moving, a region 33A having a predetermined width from a straight line connecting the center of gravity 31A of the occupied area of the crowd 30A and the center of gravity 52 of the object such as the doorway 51 to be the destination. Similarly, the crowd characteristic estimator 103 may regard, as the region which the crowd 30B passes through upon moving, a region 33B having a predetermined width from a straight line connecting the center of gravity 31B of the occupied area of the crowd 30B and the center of gravity 52 of the object such as the doorway 51 to be the destination. In such cases, the crowd characteristic estimator 103 may cause the widths of the regions which the crowds 30A and 30B pass through upon moving to be greater with the increasing numbers of the individuals 20 included in the crowds 30A and 30B. Alternatively, the crowd characteristic estimator 103 may cause the widths of the regions which the crowds 30A and 30B pass through upon moving to be greater with the increasing occupied areas of the crowds 30A and 30B.

The plan controller 104 controls the creation mode of the action plan for the movable body 10 on the basis of the information regarding the characteristic of the crowd 30 estimated by the crowd characteristic estimator 103. Specifically, the plan controller 104 may control at least one or more of an algorithm or a parameter to be used in creating the action plan for the movable body 10 on the basis of the information regarding the estimated characteristic of the crowd 30.

For example, in a case where the movable body 10 is included in the moving route of the crowd 30 or the region which the crowd 30 passes through upon moving, the plan creator 105, which will be described later, creates an action plan that causes the movable body 10 to so move as to be out of the moving route of the crowd 30 or the region which the crowd 30 passes through upon moving.

On this occasion, the plan controller 104 may control a distance from the movable body 10 to the moving route of the crowd 30 or the region which the crowd 30 passes through upon moving, on the basis of the information regarding the characteristic of the crowd 30. For example, in a case where the moving speed of the crowd 30 is high, the plan controller 104 may so control various parameters as to allow for creation of an action plan that causes the movable body 10 to move with a greater distance from the moving route of the crowd 30 or the region which the crowd 30 passes through upon moving. Further, in a case where the region which the crowd 30 passes through upon moving is large, or in a case where the possibility that the movement of the crowd 30 and the movement of the mobile body interfere with each other is determined to be high, for example, in a case where the randomness of the moves of the individuals 20 included in the crowd 30 is high, or the like, the plan controller 104 may so control the various parameters as to allow for creation of the action plan that causes the movable body 10 to move with a greater distance from the moving route of the crowd 30 or the region which the crowd 30 passes through upon moving in a similar manner. Thus, the plan controller 104 is able to so control the plan creator 105, which will be described later, as to allow for creation of an action plan that causes the movable body 10 to move along a route with a greater distance from the crowd 30.

Further, the plan controller 104 may control a destination of the movable body 10 or a route to the destination on the basis of the position or the moving route of the crowd 30. For example, in a case where a plurality of destinations of the mobile body 10 or a plurality of routes to the destination are conceivable by the plan creator 105, the plan controller 104 may so control the parameters for the creation of the action plan as to allow for selecting of a destination or a route to the destination having a greater distance from the position or the moving route of the crowd 30.

Further, the plan controller 104 may control whether or not to regard a region between the individuals 20 in the crowd 30 as a passable region of the movable body 10, depending on the mutual social connection degree of the individuals 20 in the crowd 30. For example, in a case where the mutual social connection degree of the individuals 20 in the crowd 30 is low, the plan controller 104 may regard the region between the individuals 20 in the crowd 30 as the passable region of the movable body 10. A reason for this is that, in the case where the mutual social connection degree between the individuals 20 is low, a psychological effect on the individuals 20 caused by the movable body 10 passing through or across the region between the individuals 20 seems to be small. In contrast, in a case where the mutual social connection degree of the individuals 20 in the crowd 30 is high, the plan controller 104 may regard the region between the individuals 20 in the crowd 30 as the non-passable region of the movable body 10. A reason for this is that, in the case where the mutual social connection degree between the individuals 20 is high, the psychological effect on the individuals 20 caused by the movable body 10 passing through or across the region between the individuals 20 seems to be great.

Further, the plan controller 104 may control the algorithm to be used by the plan creator 105 in creating the action plan, on the basis of the randomness of the moves of the individuals 20 in the crowd 30.

For example, in a case where the randomness of the moves of the individuals 20 in the crowd 30 is high, the plan controller 104 may control the algorithm to be used in the creation of the action plan to be a machine-learning algorithm. A reason for this is that the machine-learning algorithm is more compatible with an environment having higher randomness than other algorisms including a rule-based algorism, and therefore seems to allow for more efficient creation of the action plan. In contrast, in a case where the randomness of the moves of the individuals 20 in the crowd 30 is low, the plan controller 104 may control the algorithm to be used in the creation of the action plan to be a rule-based algorithm. A reason for this is that the rule-based algorism has a lower calculation load than the machine-learning algorism or the like, and seems to allow for faster answering for a simple problem. The environment having low randomness causes less difficulty in the creation of the action plan. Accordingly, the plan controller 104 is able to reduce the calculation load caused by the creation of the action plan by causing the action plan to be created by means of a simpler algorithm.

In addition, the plan controller 104 may control the creation mode of the action plan for the movable body 10 on the basis of information regarding a characteristic of the movable body 10 and a task to be executed by the movable body 10.

Specifically, the plan controller 104 may control the creation mode of the action plan for the movable body 10 on the basis of a moving characteristic of the movable body 10. For example, the plan controller 104 may control the plan creator 105 to use a moving speed, a moving method, or a control method in moving of the movable body 10 as a parameter used in planning a route which the movable body 10 moves along. Thus, the plan controller 104 is able to so control the creation mode of the action plan as to allow for creation of an action plan taking into consideration a machine characteristic of the movable body 10. For example, in a case where the moving speed of the movable body 10 is high, the plan controller 104 may control the creation mode of the plan creator 105 as to allow for creation of an action plan causing the movable body 10 to move in a direction away from the crowd 30 or the moving route of the crowd 30.

Further, the plan controller 104 may control the creation mode of the action plan for the movable body 10 on the basis of a content of the task to be executed by the movable body 10. For example, in a case where the task to be executed by the movable body 10 is a task configured to give higher priority to the movement of the movable body 10, the plan controller 104 may so control the creation mode of the plan creator 105 as to allow for creation of an action plan that causes the moving distance of the movable body 10 to be shorter. Note that as the task configured to give higher priority to the movement of the movable body 10, an urgent task that requires shorter-time execution can be assumed. Examples of such a task include a task of carrying an AED (Automated External Defibrillator) or the like.

The plan creator 105 creates the action plan for the movable body 10 on the basis of the creation mode controlled by the plan controller 104. Specifically, the plan creator 105 may create an action plan that causes the movable body 10 to move on the environment map created by the external-environment recognizer 101, on the basis of the algorithm and the parameter controlled by the plan controller 104. For example, the plan creator 105 may create the action plan that causes the movable body 10 to move, with use of the algorithm selected by the plan controller 104 from among a plurality of algorithms, including a machine-learning algorithm a rule-based algorithm, and the like, prepared in advance. Further, the plan creator 105 may set a condition for the route along which the movable body 10 is caused to move, or may change priorities in creating the action plan, on the basis of the various parameters controlled by the plan controller 104.

The state recognizer 106 recognizes a state of the movable body 10 on the basis of the sensing result acquired from an internal sensor section 120. Specifically, the state recognizer 106 may recognize a position, an attitude, and the like of the movable body 10 on the basis of the sensing result obtained by the internal sensor section 120 provided in the movable body 10.

For example, in a case where the internal sensor section 120 includes an encoder provided at each joint of a leg or an arm, the state recognizer 106 may recognize the attitude of the movable body 10 by calculating an attitude of the leg or an arm from the sensing result obtained by the encoder. Further, in a case where the internal sensor section 120 includes an encoder provided on each wheel, the state recognizer 106 may recognize the position of the movable body 10 by calculating the moving direction and the moving distance of the movable body 10 from the sensing result obtained by the encoder. Further, in a case where the internal sensor section 120 includes an IMU (Inertial Measurement Unit) having a three-axis gyroscope and a three-way accelerometer, the state recognizer 106 may recognize the attitude or the position of the movable body 10 from the three-dimensional angular velocity and the acceleration of the movable body 10 measured by the IMU. In addition, in a case where the internal sensor section 120 includes a GNSS (Global Navigation Satellite System) sensor, the state recognizer 106 may recognize the position of the movable body 10 on the basis of position information from the GNSS sensor.

The task manger 107 manages the task to be executed by the movable body 10. For example, the task manger 107 may manage the timings or the priorities of execution of tasks inputted to the movable body 10 by the user by means of the input section 130 or of tasks autonomously set by the movable body 10.

The input section 130 is, for example, an input device that accepts an input from a user, such as a mouse, a keyboard, a touch panel, a button, a switch, or a lever. Alternatively, the input section 130 may be a microphone that accepts an audio input from a user. The input section 130 may be provided on the movable body 10, or may be provided outside the movable body 10. In a case where the input section 130 is provided outside the movable body 10, the input section 130 may be a remote control device that transmits the input content to the movable body 10 by means of wireless communication or the like.

The driving controller 108 controls a driver section 140 on the basis of the action plan. Specifically, the driving controller 108 controls the operation of the movable body 10 by controlling the driver section 140 on the basis of the action plan created by the plan creator 105. For example, the driving controller 108 may so control the driver section 140 that the movable body 10 moves along a route included in the action plan.

The driver section 140 is, for example, a motor or an actuator that drives a moving mechanism included in the movable body 10. Specifically, the driver section 140 may be a motor that drives a two-wheeled or four-wheeled movable device, or an actuator that drives a two-legged or four-legged movable device.

The information processing apparatus 100 including the above-described configuration is able to estimate the information regarding the characteristic of the crowd 30, which is a collection of the individuals 20, and to control the creation mode of the action plan for the movable body 10 on the basis of the estimated information regarding the characteristic of the crowd 30. Accordingly, the information processing apparatus 100 is able to create, by referring to the moving characteristic or the density characteristic of the crowd 30, an action plan for the movable body 10 that allows the movable body 10 to move efficiently without blocking the moving route of each of the individuals 20 included in the crowd 30.

3. Relationship Between Information Processing Apparatus and Movable Body

Next, a relationship between the information processing apparatus 100 according to the present embodiment and the movable body 10 is to be described. The information processing apparatus 100 according to the present embodiment is able to configure various variations of systems together with the movable body 10, as described below. That is, the information processing apparatus 100 is applicable to various control systems including the movable body 10 (e.g., a robot).

For example, the information processing apparatus 100 according to the present embodiment may be mounted on the movable body 10. In such a case, the information processing apparatus 100 is able to perform the above-described control by performing transmission and reception of information with the external sensor section 110, the internal sensor section 120, the input section 130, and the driver section 140 similarly mounted on the movable body 10 via an inner bus or the like.

In a case where the information processing apparatus 100 is mounted on the movable body 10, it is possible to perform the above-described control by the movable body 10 alone even in a case where connection to a public communication network such as the Internet is lost in the event of a disaster. Accordingly, the movable body 10 is able to perform evacuation guidance or the like of the individuals 20 without blocking the movement lines of the individuals 20 who have come to the space 50 (i.e., customers) even in emergencies.

Further, the information processing apparatus 100 according to the present embodiment may be provided separately from the movable body 10, for example. Such a case is to be described with reference to FIG. 5. FIG. 5 is a schematic explanatory diagram describing about a configuration example in a case where the information processing apparatus 100, the movable body 10, and the external sensor section 110 are provided separately.

As illustrated in FIG. 5, the information processing apparatus 100 is provided separately from the movable body 10 and the external sensor section 110. The information processing apparatus 100 is able to perform the above-described control by performing transmission and reception of information via a network 60. Specifically, the information processing apparatus 100 is able to transmit the created action plan to the movable body 10 by creating the action plan for the movable body 10 on the basis of information acquired from the movable body 10 and the external sensor section 110 via the network 60. For example, in order to perform sensing on the entire space 50, the external sensor section 110 may be provided on the ceiling or the like of the space 50 in which the crowd 30, which is a collection of the individuals 20, and the movable body 10 are present. Further, the information processing apparatus 100 may be a server or the like provided outside the space 50.

In a case where the information processing apparatus 100 is provided separately from the movable body 10, even if the movable body 10 has a simpler configuration, the information processing apparatus 100 is able to perform the above-described control.

Further, the information processing apparatus 100 is able to acquire the information regarding the characteristic of the crowd 30 from the external sensor section 110 for the entire space 50. The information processing apparatus 100 is therefore able to optimize the action plan for the movable body 10 for the entire space 50. Accordingly, for example, the information processing apparatus 100 is able to create an action plan for guiding the crowd 30 equally to a plurality of doorways 51 present in the space 50 at the time of a disaster, and cause the movable body 10 to perform the created action plan.

4. Operation Examples

4.1. First Operation Example

Next, referring to FIGS. 6, 7A, and 7B, a first operation example of the information processing apparatus 100 according to the present embodiment is to be described. FIG. 6 is a flowchart illustrating a flow of the first operation example of the information processing apparatus 100 according to the present embodiment.

The first operation example is an operation example of the information processing apparatus 100 in a case of causing the movable body 10 to so move as to avoid the moving route of the crowd 30.

As illustrated in FIG. 6, first, the external-environment recognizer 101 acquires information regarding the space 50 in which the movable body 10 and the individuals 20 are present from the external sensor section 110 (S101). Thereafter, the crowd recognizer 102 recognizes the crowd 30 present in the space 50 (S103). Thereafter, the crowd characteristic estimator 103 estimates the information regarding the characteristic of the crowd 30 including the moving route of the crowd 30 (S105).

Here, the plan controller 104 determines whether or not the moving route of the crowd 30 and the movable body 10 interfere with each other (S107). In a case where the moving route of the crowd 30 and the movable body 10 interfere with each other (S107/Yes), the plan controller 104 so controls the creation mode of the action plan for the movable body 10 as to allow for creation of an action plan in which the moving route of the crowd 30 and the movable body 10 do not interfere with each other (S109). In contrast, in a case where the moving route of the crowd 30 and the movable body 10 do not interfere with each other (S107/No), the information processing apparatus 100 skips the operation in step S109. Thereafter, the plan creator 105 creates the action plan for the movable body 10 on the basis of the creation mode (S111). In addition, the driving controller 108 controls the movement of the movable body 10 by controlling the driver section 140 in accordance with the created action plan (S113).

Referring to FIGS. 7A and 7B, the above-described first operation example is described more specifically. FIG. 7A is an explanatory diagram describing about estimation of the moving route of the crowd 30 in the first operation example. FIG. 7B is an explanatory diagram describing about creation of the action plan for the movable body 10 in the first operation example.

For example, as illustrated in FIGS. 7A and 7B, the external-environment recognizer 101 and the crowd recognizer 102 recognize the positions of crowds 30A, 30B, and 30C and movable bodies 10A and 10B that are present in the space 50.

Next, the crowd characteristic estimator 103 estimates moving-route candidates $P_{AA}$ and $P_{AB}$ of the crowd 30A as information regarding a characteristic of the crowd 30A. Similarly, the crowd characteristic estimator 103 estimates moving-route candidates $P_{BA}$ and $P_{BB}$ of the crowd 30B as information regarding a characteristic of the crowd 30B, and estimates moving-route candidates $P_{CA}$ and $P_{CB}$ of the crowd 30C as information regarding a characteristic of the crowd 30C. The moving-route candidates of the crowds 30A, 30B, and 30C can be estimated, for example, from the respective positions of the crowds 30A, 30B, and 30C and the positions of the doorways 51A and 51B.

Thereafter, the crowd characteristic estimator 103 estimates a region $W_{AA}$ which the crowd 30A passes through upon moving, as the information regarding the characteristic of the crowd 30A. Similarly, the crowd characteristic estimator 103 estimates a region $W_{BB}$ which the crowd 30B passes through upon moving, as the information regarding the characteristic of the crowd 30B, and estimates a region $W_{CA}$ which the crowd 30C passes through upon moving, as the information regarding the characteristic of the crowd 30C. For example, it is possible to estimate the region which the crowd 30A passes through upon moving by providing a width according to the number of people in the crowd 30A to the moving-route candidate $P_{AA}$ having the shortest moving distance of the moving-route candidates $P_{AA}$ and $P_{AB}$ of the crowd 30A estimated above. This is similarly applicable to the crowds 30B and 30C.

On this occasion, a plurality of route candidates is conceivable as an action plan in which each of the movable body 10A that interferes with the region $W_{AA}$ which the crowd 30A passes through upon moving and the movable body 10B that interferes with the region $W_{BB}$ which the crowd 30B passes through upon moving is caused to move to any of escape areas 53A, 53B, and 53C. For example, regarding the movable body 10A, a route candidate $R_{A1}$ for moving to the escape area 53A and a route candidate $R_{A2}$ for moving to the escape area 53C are conceivable. Regarding the movable body 10B, a route candidate $R_{B1}$ for moving to the escape area 53A and a route candidate $R_{B2}$ for moving to the escape area 53B are conceivable.

In the information processing apparatus 100 according to the present embodiment, the plan controller 104 controls the creation mode of the action plan of the plan creator 105. Thus, the plan creator 105 is able to efficiently create an action plan that causes the movable bodies 10A and 10B to escape from the moving routes or the like of the crowds 30A, 30B, and 30C and to move to any of the escape areas 53A, 53B, and 53C.

Specifically, regarding the movable body 10A, the plan controller 104 is able to so control the creation mode as to allow for creation of an action plan including the route candidate $R_{A1}$ that does not interfere with the moving route of the crowd 30C although having a longer moving distance. Further, regarding the movable body 10B, the plan controller 104 is able to so control the creation mode as to allow for creation of an action plan including the route candidate $R_{B2}$ that does not pass across the moving route of the crowd 30B although having a longer moving distance.

Thus, the information processing apparatus 100 is able to prevent the action plans for the movable bodies 10A and 10B and the moving routes of the crowds 30A, 30B, and 30C from crossing, by estimating the moving routes of the crowds 30A, 30B, and 30C and the regions which the crowds 30A, 30B, and 30C pass through upon moving. Further, the information processing apparatus 100 is able to prevent the movable bodies 10A and 10B from becoming close to each of the individuals 20 included in the crowds 30A, 30B, and 30C. The information processing apparatus 100 is therefore able to prevent ad hoc or staggering behavior of the movable bodies 10A and 10B.

4.2. Second Operation Example

Next, referring to FIG. 8 and FIG. 9, a second operation example of the information processing apparatus 100 according to the present embodiment is to be described. FIG. 8 is a flowchart illustrating a flow of the second operation example of the information processing apparatus 100 according to the present embodiment.

The second operation example is an operation example of the information processing apparatus 100 in a case where an action plan is created giving higher priority to moving the movable body 10 than preventing the crossing of the movable body 10 and the movement line of the crowd 30. Note that in the second operation example, it is assumed that the operation corresponding to steps S101 to S103 of the first operation example has already been executed.

As illustrated in FIG. 8, first, the task manger 107 acquires a task to be executed by the movable body 10, on the basis of an input received from the input section 130 (S201). Thereafter, the plan controller 104 determines whether or not the task to be executed by the movable body 10 is a highly urgent task (S203).

In a case where the task to be executed by the movable body 10 is the highly urgent task (S203/Yes), the plan controller 104 so controls the creation mode as to allow for creation of an action plan giving higher priority to the movement of the movable body 10. Specifically, the plan controller 104 determines whether or not the moving route of the crowd 30 included in the information regarding the characteristic of the crowd 30 and the movable body 10 interfere with each other (S211), and optimizes the creation mode of the action plan for the movable body 10 on the basis of the characteristic of the movable body and the characteristic of the task (S213). For example, the plan controller 104 may so optimize the algorithm and the parameter to be used in creation of the action plan as to allow the movable body 10 to execute the task with a shorter moving distance. Note that in a case where the moving route of the crowd 30 and the movable body 10 do not interfere with each other (S211/No), the plan controller 104 omits execution of step S213 described above.

In a case where the task to be executed by the movable body 10 is not the highly urgent task (S203/No), the plan controller 104 so controls the creation mode as to allow for creation of an action plan in which the moving route of the crowd 30 and the movable body 10 do not interfere with each other, as in S107 and S109 of the first operation example. Specifically, the plan controller 104 determines whether or not the moving route of the crowd 30 included in the information regarding the characteristic of the crowd 30 and the movable body 10 interfere with each other (S221), and controls the creation mode of the action plan for the movable body 10 (S223). Note that in a case where the moving route of the crowd 30 and the movable body 10 do not interfere with each other (S221/No), the plan controller 104 skips the operation in step S223 described above.

Thereafter, the plan creator 105 creates the action plan for the movable body 10 on the basis of the creation mode controlled by the plan controller 104 (S205). Further, the driving controller 108 controls the movement of the movable body 10 by controlling the driver section 140 in accordance with the created action plan (S207).

The above-described operation example is to be described more specifically with reference to FIG. 9. FIG. 9 is an explanatory diagram describing about creation of the action plan for the movable body 10 in the second operation example.

For example, as illustrated in FIG. 9, assume that the task is a highly urgent task that gives higher priority to moving the movable body 10 to a destination 70, and that the crowds 30A and 30B are present between the movable body 10 and the destination 70. Note that it is assumed that a moving route PA of the crowd 30A and a region $w_A$ which the crowd 30A passes through upon moving have already been estimated by operation corresponding to steps S101 to S103 of the first operation example, and a moving route $P_B$ of the crowd 30B and a region $w_B$ which the crowd 30B passes through upon moving have already been estimated in a similar manner.

In such a case, a plurality of route candidates $r_1$, $r_2$, and $r_3$ is conceivable as routes for the movable body 10 to reach the destination 70. The plan controller 104 is able to control which of the route candidates $r_1$, $r_2$, and $r_3$ is adopted as the action plan by controlling the creation mode on the basis of the characteristic of the movable body 10 and the characteristic of the task. Further, the plan controller 104 is able to set an optimum algorism and an optimum parameter for each of the route candidates $r_1$, $r_2$, and $r_3$ on the basis of the characteristic of the movable body 10 and the characteristic of the task.

For example, the route candidate $r_1$ that bypasses the outside of the crowd 30A is a route that allows for avoidance of the crowds 30A and 30B and has a relatively short distance to the destination 70. However, it is estimated that the crowd 30A is a group in which the density of the individuals 20 is low and the randomness of the respective moves of the individuals 20 is high. Therefore, it is estimated that, regarding the route candidate $r_1$, the possibility of an increase in moving time caused by a random factor is high.

In such a case, the plan controller 104 may so control the creation mode that a more optimal action plan is created, by changing the algorithm to be used by the plan creator 105 to an algorithm suitable for an environment with high randomness, such as a machine-learning algorithm. Further, in a case where the randomness with respect to the movable body 10 is low or in a case where the task involves a strict time limitation, the plan controller 104 may so control the creation mode that the route candidate $r_1$ is not adopted as the action plan, by lowering the priority of the route candidate $r_1$.

For example, the route candidate $r_2$ passing between the individuals 20 inside the crowd 30A is a route having the shortest distance to the destination 70. However, because the route candidate $r_2$ passes through the inside of the crowd 30A, it is estimated that it is difficult to predict a specific route and specific moving time. Further, there is a possibility that the route candidate $r_2$ causes an unpleasant feeling in the individuals 20 by the movement of the movable body 10 depending on the density and the social connection degree of the individuals 20 in the crowd 30A.

In such a case, the plan controller 104 may so control the creation mode that a more optimal action plan is created, by changing the algorithm to be used in the plan creator 105 to an algorithm suitable for an environment with high randomness, such as a machine-learning algorithm. Further, the plan controller 104 may control whether or not to regard the inside of the crowd 30A as a passable region on the basis of the density and the social connection degree of the individuals 20 in the crowd 30A. In addition, the plan controller 104 may so control the creation mode of the action plan that the movable body 10 does not approach the crowd 30B in which the social connection degree of the individuals 20 is high.

The route candidate $r_3$ bypassing the outside of the crowd 30B is a route that allows for avoidance of the crowds 30A and 30B but has the longest distance to the destination 70. However, it is estimated that the crowd 30B is a group in which the density of the individuals 20 is high and the randomness of the respective moves of the individuals 20 is low. Therefore, it is estimated that the route candidate $r_3$ is a route having the lowest randomness.

Accordingly, the plan controller 104 may so control the creation mode that the route candidate $r_3$ is easily adopted as the action plan by increasing the priority of the route candidate $r_3$ in a case where the randomness with respect to the movable body 10 is low.

Thus, the information processing apparatus 100 is able to more efficiently plan the route in a case where the movable body 10 passes a region close to the crowds 30A and 30B by understanding the characteristics of the crowds 30A and 30B.

5. Hardware Configuration Examples

In addition, referring to FIG. 10, a hardware configuration of the information processing apparatus 100 according to the present embodiment is to be described. FIG. 10 is a block diagram illustrating a hardware configuration example of the information processing apparatus 100 according to the present embodiment.

The functions of the information processing apparatus 100 according to the present embodiment are implemented by cooperation between software and hardware described below. For example, the functions of the external-environment recognizer 101, the crowd recognizer 102, the crowd characteristic estimator 103, the plan controller 104, the plan creator 105, the state recognizer 106, the task manger 107, and the driving controller 108 described above may be executed by a CPU 901.

As illustrated in FIG. 10, the information processing apparatus 100 includes a CPU (Central Processing Unit) 901, a ROM (Read Only Memory) 903, and a RAM (Random Access Memory) 905.

In addition, the information processing apparatus 100 may further include a host bus 907, a bridge 909, an external bus 911, an interface 913, an input unit 915, an output unit 917, a storage unit 919, a drive 921, a coupling port 923, and a communication unit 925. In addition, the information processing apparatus 100 may include other processing circuits, for example, a DSP (Digital Signal Processor), an ASIC (Application Specific Integrated Circuit), or the like, in place of the CPU 901 or together with the CPU 901.

The CPU 901 functions as a calculation unit or a control unit, and controls the overall operation of the information processing apparatus 100 in accordance with various programs recorded in the ROM 903, the RAM 905, the storage unit 919, or a removable recording medium 927. The ROM 903 stores a program and arithmetic parameters to be used by the CPU 901. The RAM 905 temporarily stores a program to be used in execution by the CPU 901 and parameters to be used in the execution thereof.

The CPU 901, the ROM 903, and the RAM 905 are mutually coupled by the host bus 907 including an internal bus such as a CPU bus. In addition, the host bus 907 is coupled to the external bus 911 such as a PCI (Peripheral Component Interconnect/Interface) bus via the bridge 909.

The input unit 915 is a unit that accepts an input from a user, such as a mouse, a keyboard, a touch panel, a button, a switch, or a lever. Note that the input unit 915 may be a microphone or the like that detects a voice of a user. The input unit 915 may be, for example, a remote control unit utilizing infrared rays or other radio waves, and may be an external coupling apparatus 929 compatible with the operation of the information processing apparatus 100.

The input unit 915 further includes an input control circuit that supplies, to the CPU 901, an input signal generated on the basis of information inputted by the user. The user is able to input various data or give a process operation instruction to the information processing apparatus 100 by operating the input unit 915.

The output unit 917 is a unit that is able to visually or audibly present information acquired or generated by the information processing apparatus 100 to a user. The output unit 917 may be, for example, a display unit such as an LCD (Liquid Crystal Display), a PDP (Plasma Display Panel), an OLED (Organic Light Emitting Diode) display, a hologram, or a projector. Further, the output unit 917 may be a sound output device such as a speaker or a headphone, or may be a printing device such as a printer. The output unit 917 may output information obtained by the process of the information processing apparatus 100 as an image such as a text or a picture, or a sound such as a voice or an acoustic sound.

The storage unit 919 is a data storage device configured as an example of a storage section of the information processing apparatus 100. The storage unit 919 may include, for example, a magnetic storage device such as an HDD (Hard Disk Drive), a semiconductor storage device, an optical storage device, a magneto-optical storage device, or the like. The storage unit 919 is able to store a program to be executed by the CPU 901, various data, various data acquired from outside, and the like.

The drive 921 is a reading or writing unit for the removable recording medium 927 such as a magnetic disk, an optical disk, a magneto-optical disk, or a semiconductor memory. The drive 921 is built in or externally attached to the information processing apparatus 100. For example, the drive 921 is able to read information recorded in the removable recording medium 927 mounted thereon and supply the information to the RAM 905. Further, the drive 921 is able to write a record in the mounted removable recording medium 927.

The coupling port 923 is a port for directly coupling the external coupling apparatus 929 to the information processing apparatus 100. The coupling port 923 may be, for example, a USB (Universal Serial Bus) port, an IEEE1394 port, an SCSI (Small Computer System Interface) port, or the like. Further, the coupling port 923 may be an RS-232C port, an optical audio terminal, an HDMI (registered trademark) (High-Definition Multimedia Interface) port, or the like. The coupling port 923 is able to perform transmission and reception of various data between the information processing apparatus 100 and the external coupling apparatus 929 by being coupled to the external coupling apparatus 929.

The communication unit 925 is, for example, a communication interface including a communication device for coupling to the communication network 931. The communication unit 925 may be, for example, a wired or wireless LAN (Local Area Network), Bluetooth (registered trademark), a communication card for WUSB (Wireless USB), or the like. Further, the communication unit 925 may be a router for optical communication, a router for ADSL (Asymmetric Digital Subscriber Line), a modem for various types of communication, or the like.

For example, the communication unit 925 is able to perform transmission and reception of a signal or the like with the Internet or another communication apparatus with use of a predetermined protocol such as TCP/IP. The communication network 931 coupled to the communication unit 925 may be a network coupled with or without a wire. The communication network 931 may be, for example, an Internet communication network, a domestic LAN, an infrared-ray communication network, a radio wave communication network, a satellite communication network, or the like.

Note that it is also possible to create a program for causing the hardware built in the computer such as the CPU 901, the ROM 903, and the RAM 95 to exhibit functions equivalent to those of the information processing apparatus 100 described above. Further, it is also possible to provide a recording medium in which such a program is recorded and that is readable by the computer.

The technology according to the present disclosure has been described above with reference to the embodiment. According to the information processing apparatus 100 of the present embodiment, a collection of the plurality of individuals 20 is recognized as the crowd 30, and the characteristic of the recognized crowd 30 is taken into consideration in the action plan for the movable body 10. This makes it possible to take into consideration a movement tendency of each of the individuals 20 in the action plan for the movable body 10. Therefore, the information processing apparatus 100 is able to create an action plan for the movable body 10 that does not adversely affect the individuals 20 even in an environment in which many individuals 20 are present in a mixed manner.

Specifically, the information processing apparatus 100 is able to create an action plan to take an avoidance action with respect to the crowd 30 which is a collection of the individuals 20 rather than each of the individuals 20. This makes it possible to prevent the movable body 10 from making an unstable move to deal with each of the individuals 20. Further, the information processing apparatus 100 is able to similarly create an action plan for the movable body 10 in either normal or urgent situation. This allows the configuration of the system including the movable body 10 to be simpler and more shared. Accordingly, the information processing apparatus 100 makes it possible to reduce the operation cost of the system including the movable body 10. In addition, the information processing apparatus 100 is able to create the action plan for the movable body 10 without minutely dividing the surrounding environment of the movable body 10. This makes it possible to improve robustness (erroneous detection resistance) at a time of detection of the surrounding environment of the movable body 10.

Note that the technology according to the present disclosure is not limited to the above-described embodiments and the like, and is modifiable in a variety of ways.

Furthermore, not all of the configurations and the operations described in the respective embodiments are essential to the configurations and the operations of the present disclosure. For example, among the components in each embodiment, components not described in the independent claims describing the most superordinate concept of the present disclosure should be understood as optional components.

The terms used throughout the specification and the appended claims should be construed as "non-limiting" terms. For example, the terms "include" or "be included" should be construed as "not limited to the example described with the term included". The term "have" should be construed as "not limited to the example described with the term have".

The terms used herein include some terms that are used merely for convenience of description and are not used to limit the configuration and the operation. For example, the term such as "right," "left," "upper," or "lower" merely indicates a direction in the referred drawing. Further, the terms "inner" and "outer" merely indicate a direction toward the center of the component of interest and a direction away from the center of the component of interest, respectively. This similarly applies to terms similar to the above-described terms and terms having similar meanings.

Note that the technology according to the present disclosure may have the following configurations. According to the technology according to the present disclosure having the following configurations, the information processing apparatus is able to take into consideration, in the action plan for the movable body, the move and the characteristic of the crowd which is a collection of individuals rather than each of the individuals. Accordingly, the information processing apparatus is able to create an action plan that efficiently causes the movable body to move without being disturbed by each of the individuals even in an environment where many individuals are present. Effects exerted by the technology according to the present disclosure are not necessarily limited to the effects described here, and may be any of the effects described in the present disclosure.

(1)
An information processing apparatus including:
a crowd characteristic estimator that estimates information regarding a characteristic of a crowd on the basis of a sensing result of an external environment, the crowd being a collection of individuals present in the external environment; and
a plan controller that controls a creation mode of an action plan for a movable body in the external environment on the basis of at least the information regarding the characteristic.

(2)
The information processing apparatus according to (1) described above, in which the information regarding the characteristic includes information regarding at least any one or more of a density of the individuals in the crowd, a mutual social connection degree of the individuals, or randomness of moves of the individuals.

(3)
The information processing apparatus according to (1) or (2) described above, in which the information regarding the characteristic includes information regarding a movement characteristic of the crowd.

(4)
The information processing apparatus according to (3) described above, in which the information regarding the movement characteristic of the crowd includes information regarding at least any one or more of a moving direction, a moving speed, a moving route, or a passing region upon moving of the crowd.

(5)
The information processing apparatus according to any one of (1) to (4) described above, further including a crowd recognizer that recognizes the crowd by performing clustering on the sensing result.

(6)
The information processing apparatus according to any one of (1) to (5) described above, further including a plan creator that creates the action plan for the movable body on the basis of the creation mode controlled by the plan controller.

(7)
The information processing apparatus according to (6) described above, in which the plan controller controls, as the creation mode, at least one or more of an algorithm or a parameter to be used when the plan creator creates the action plan.

(8)
The information processing apparatus according to (7) described above, in which the plan controller controls at least one or more of the algorithm or the parameter to be used by the plan creator, on the basis of information regarding a density of the individuals in the crowd.

(9)
The information processing apparatus according to (7) or (8) described above, in which the plan controller controls whether a machine-learning-based algorithm or a rule-based algorithm is to be used by the plan creator, on the basis of information regarding randomness of moves of the individuals in the crowd.

(10)
The information processing apparatus according to any one of (7) to (9) described above, in which the plan controller controls whether or not the plan creator determines that a space between the individuals in the crowd is passable, on the basis of information regarding a mutual social connection degree of the individuals in the crowd.

(11)
The information processing apparatus according to any one of (6) to (10) described above, in which the plan controller controls the creation mode to cause the plan creator to create the action plan in which a moving route of the crowd and the movable body do not interfere with each other.

(12) The information processing apparatus according to (11) described above, in which the plan creator creates the action plan that causes the movable body to be out of the moving route of the crowd on the basis of the creation mode.

(13) The information processing apparatus according to any one of (6) to (12) described above, in which the plan controller controls the creation mode of the action plan for the movable body further on the basis of information regarding a characteristic of the movable body or a task to be executed by the movable body.

(14) The information processing apparatus according to (13) described above, in which the plan creator creates the action plan in which the moving route of the crowd and a moving route of the movable body interfere with each other, in a case where the task to be executed by the movable body is a predetermined content.

(15) The information processing apparatus according to (14) described above, in which the plan controller optimizes the creation mode at a time when the plan creator creates the action plan in which the moving route of the crowd and the moving route of the movable body interfere with each other.

(16) An information processing method including:
by a calculation processor,
estimating information regarding a characteristic of a crowd on the basis of a sensing result of an external environment, the crowd being a collection of individuals present in the external environment; and
controlling a creation mode of an action plan for a movable body in the external environment on the basis of at least the information regarding the characteristic.

(17) A program causing a computer to function as
a crowd characteristic estimator that estimates information regarding a characteristic of a crowd on the basis of a sensing result of an external environment, the crowd being a collection of individuals present in the external environment, and
a plan controller that controls a creation mode of an action plan for a movable body in the external environment on the basis of at least the information regarding the characteristic.

This application claims the priority on the basis of Japanese Patent Application No. 2020-039058 filed on Mar. 6, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing apparatus, comprising:
a central processing unit (CPU) configured to:
receive a sensing result associated with an external environment;
generate first information, associated with a plurality of characteristics of a crowd, based on the received sensing result, wherein the crowd is a collection of individuals present in the external environment; and
control, based on at least the generated first information, a creation mode of an action plan for a movable body in the external environment, wherein the action plan includes a first route of movement of the movable body that passes between the collection of the individuals inside the crowd; and
a display screen configured to display at least the action plan of the movable body.

2. The information processing apparatus according to claim 1, wherein the plurality of characteristics includes information associated with at least one of a density of the collection of the individuals in the crowd, a mutual social connection degree of the collection of the individuals, or a randomness of moves of the collection of the individuals.

3. The information processing apparatus according to claim 1, wherein the plurality of characteristics includes information associated with a movement characteristic of the plurality of characteristics of the crowd.

4. The information processing apparatus according to claim 3, wherein the movement characteristic of the crowd includes information associated with at least one of a direction of a movement of the crowd, a speed of the movement of the crowd, a second route of the movement of the crowd, or a region which the crowd passes based on the movement of the crowd.

5. The information processing apparatus according to claim 1, wherein the CPU is further configured to:
cluster the collection of the individuals based on the sensing result; and
recognize the crowd based on the clustered collection of the individuals.

6. The information processing apparatus according to claim 1, wherein the CPU is further configured to generate the action plan for the movable body based on the creation mode.

7. The information processing apparatus according to claim 6, wherein
the CPU is further configured to control, as the creation mode, at least one of an algorithm or a parameter, and
the at least one of the algorithm or the parameter is associated with the generation.

8. The information processing apparatus according to claim 7, wherein
the CPU is further configured to control the at least one of the algorithm or the parameter based on second information, and
the second information is associated with a density of the collection of the individuals in the crowd.

9. The information processing apparatus according to claim 7, wherein
the CPU is further configured to:
control a selection of one of a machine-learning-based algorithm or a rule-based algorithm based on second information;
control the creation mode of the action plan based on the selection of the one of the machine-learning-based algorithm or the rule-based algorithm, and
the second information is associated with a randomness of a plurality of moves of the collection of the individuals in the crowd.

10. The information processing apparatus according to claim 7, wherein
the CPU is further configured to control a recognition of a region as passable based on second information,
the region is between the collection of the individuals in the crowd, and the second information is associated with a mutual social connection degree of the collection of the individuals in the crowd.

11. The information processing apparatus according to claim 6, wherein
the CPU is further configured to generate the action plan based on a second route of movement of the crowd, and
the second route of movement of the crowd is independent of the first route of movement of the movable body.

12. The information processing apparatus according to claim 11, wherein the CPU is further configured to control, based on the creation mode, the movable body to be out of the second route of movement of the crowd.

13. The information processing apparatus according to claim 6, wherein
the CPU is further configured to control the creation mode of the action plan for the movable body based on second information,
the second information is associated with one of a specific characteristic associated with the movable body or a task associated with the movable body, and
the specific characteristic associated with the movable body includes a speed of the movable body.

14. The information processing apparatus according to claim 13, the CPU is further configured to generate the action plan based on
an interference between the first route of movement of the movable body and a second route of movement of the crowd, and
the task associated with the movable body is a specific content.

15. The information processing apparatus according to claim 14, wherein the CPU is further configured to optimize the creation mode based on the interference between the second route of movement of the crowd and the first route of movement the movable body.

16. An information processing method, the method comprising:
receiving a sensing result associated with an external environment;
generating information, associated with a characteristic of a crowd, based on the received sensing result, wherein
the crowd is a collection of individuals present in the external environment, and
the characteristic of the crowd is associated with at least one of a density of the collection of the individuals in the crowd, a mutual social connection degree of the collection of the individuals, or randomness of moves of the collection of the individuals;
controlling, based on at least the generated information, a creation mode of an action plan for a movable body in the external environment, wherein the action plan includes a route of movement of the movable body that passes between the collection of the individuals inside the crowd; and
displaying at least the action plan of the movable body on a display screen.

17. A non-transitory computer-readable medium having stored thereon, computer-executable instructions which, when executed by a processor, cause the processor to execute operations, the operations comprising:
receiving a sensing result associated with an external environment;
generating information, associated with a characteristic of a crowd, based on the received sensing result, wherein
the crowd is a collection of individuals present in the external environment, and
the characteristic of the crowd is associated with at least one of a density of the collection of the individuals in the crowd, a mutual social connection degree of the collection of the individuals, or randomness of moves of the collection of the individuals;
controlling, based on at least the generated information, a creation mode of an action plan for a movable body in the external environment, wherein the action plan includes a route of movement of the movable body that passes between the collection of the individuals inside the crowd; and
displaying at least the action plan of the movable body on a display screen.

* * * * *